US012001977B2

United States Patent
Misra et al.

(10) Patent No.: US 12,001,977 B2
(45) Date of Patent: Jun. 4, 2024

(54) SYSTEMS AND METHODS FOR PROVIDING AN INTERACTIVE VISUALIZATION OF AN ENTERPRISE IT ENVIRONMENT

(71) Applicant: GalaxE.Solutions, Inc., Somerset, NJ (US)

(72) Inventors: Dheeraj Misra, Somerset, NJ (US); Sandipan Gangopadhyay, Somerset, NJ (US); Tim Bryan, Somerset, NJ (US)

(73) Assignee: GalaxE.Solutions, Inc., Somerset, NJ (US)

( * ) Notice: Subject to any disclaimer, the term of this patent is extended or adjusted under 35 U.S.C. 154(b) by 537 days.

(21) Appl. No.: 16/746,486

(22) Filed: Jan. 17, 2020

(65) Prior Publication Data
US 2020/0234222 A1 Jul. 23, 2020

Related U.S. Application Data

(60) Provisional application No. 62/794,381, filed on Jan. 18, 2019.

(51) Int. Cl.
*G06Q 10/0631* (2023.01)
*G06Q 10/0633* (2023.01)
*G06Q 10/067* (2023.01)

(52) U.S. Cl.
CPC . *G06Q 10/063114* (2013.01); *G06Q 10/0633* (2013.01); *G06Q 10/067* (2013.01)

(58) Field of Classification Search
CPC ....... G06Q 10/063114; G06Q 10/0633; G06Q 10/067; G06F 11/3409; G06F 11/3495; G06F 11/0712; G06F 3/065; H04L 41/046
See application file for complete search history.

(56) References Cited

U.S. PATENT DOCUMENTS

| | | | | |
|---|---|---|---|---|
| 10,855,485 B1* | 12/2020 | Zhou | ..... | G06N 3/08 |
| 2004/0255253 A1* | 12/2004 | Marcjan | ..... | G06F 3/0486 |
| | | | | 715/779 |
| 2006/0047778 A1* | 3/2006 | Adams | ..... | H04L 67/125 |
| | | | | 709/217 |
| 2006/0259871 A1* | 11/2006 | Washington | ..... | G06F 8/34 |
| | | | | 717/113 |
| 2007/0126570 A1* | 6/2007 | Kathan | ..... | H01R 13/6683 |
| | | | | 340/533 |
| 2008/0301763 A1* | 12/2008 | Sasaki | ..... | G06F 11/3419 |
| | | | | 726/1 |
| 2009/0144420 A1* | 6/2009 | Attanasio | ..... | H04L 41/046 |
| | | | | 709/224 |

(Continued)

OTHER PUBLICATIONS

International Preliminary Report on Patentability (PCT/IB/326 and PCT/IB/373) and Written Opinion (PCT/ISA/237) dated Jul. 29, 2021 (Eight (8) pages).

(Continued)

*Primary Examiner* — Chris Parry
*Assistant Examiner* — Hassan A Khan
(74) *Attorney, Agent, or Firm* — Crowell & Moring LLP

(57) ABSTRACT

A system for providing a graphical user interface, including: a multi-tier hierarchy, stored in a database, which maps links between and among a plurality of tiers of an enterprise IT environment; and a dashboard that provides a user-interactive visualization of the enterprise IT environment based on the multi-tier hierarchy.

12 Claims, 3 Drawing Sheets

(56) References Cited

U.S. PATENT DOCUMENTS

| | | | |
|---|---|---|---|
| 2010/0153160 A1* | 6/2010 | Bezemer | G06Q 10/109 |
| | | | 705/348 |
| 2012/0150842 A1* | 6/2012 | Ruiz | G06F 16/2423 |
| | | | 707/718 |
| 2013/0058340 A1 | 3/2013 | Lambeth et al. | |
| 2013/0346857 A1* | 12/2013 | Zhang | H04L 41/22 |
| | | | 715/711 |
| 2014/0279677 A1* | 9/2014 | Grosset | G06Q 10/067 |
| | | | 705/348 |
| 2015/0052441 A1* | 2/2015 | Degioanni | H04L 43/045 |
| | | | 715/734 |
| 2016/0291972 A1* | 10/2016 | Bryan | G06F 8/73 |
| 2017/0193409 A1* | 7/2017 | Stevens | G06F 16/951 |
| 2018/0287876 A1* | 10/2018 | Strobel | H04L 41/142 |
| 2020/0104242 A1* | 4/2020 | Villani | G06F 8/73 |
| 2020/0219029 A1* | 7/2020 | Kumar | G06F 21/6218 |
| 2020/0234222 A1* | 7/2020 | Misra | G06Q 10/063114 |
| 2021/0011839 A1* | 1/2021 | Villani | G06F 8/73 |
| 2021/0026751 A1* | 1/2021 | Larkin | G06F 11/302 |
| 2021/0165397 A1* | 6/2021 | Hu | G05B 19/41875 |

OTHER PUBLICATIONS

PCT/US2020/014162, International Search Report (PCT/ISA/210 and PCT/ISA/220) dated Apr. 9, 2020, enclosing Written Opinion of the International Searching Authority (PCT/ISA/237) (Nine (9) pages).

Zhang et al., "Precise request tracing and performance debugging for multi-tier services of black boxes", 2009 IEEE/IFIP International Conference on Dependable Systems & Networks, Jul. 2, 2009, URL: https://arxiv.org/ftp/arxiv/papers/1003/1003.0955.pdf Ten (10) pages).

English-language Indian Office Action issued in Indian application No. 202117034747 dated Jan. 19, 2023 (Seven (7) pages).

* cited by examiner

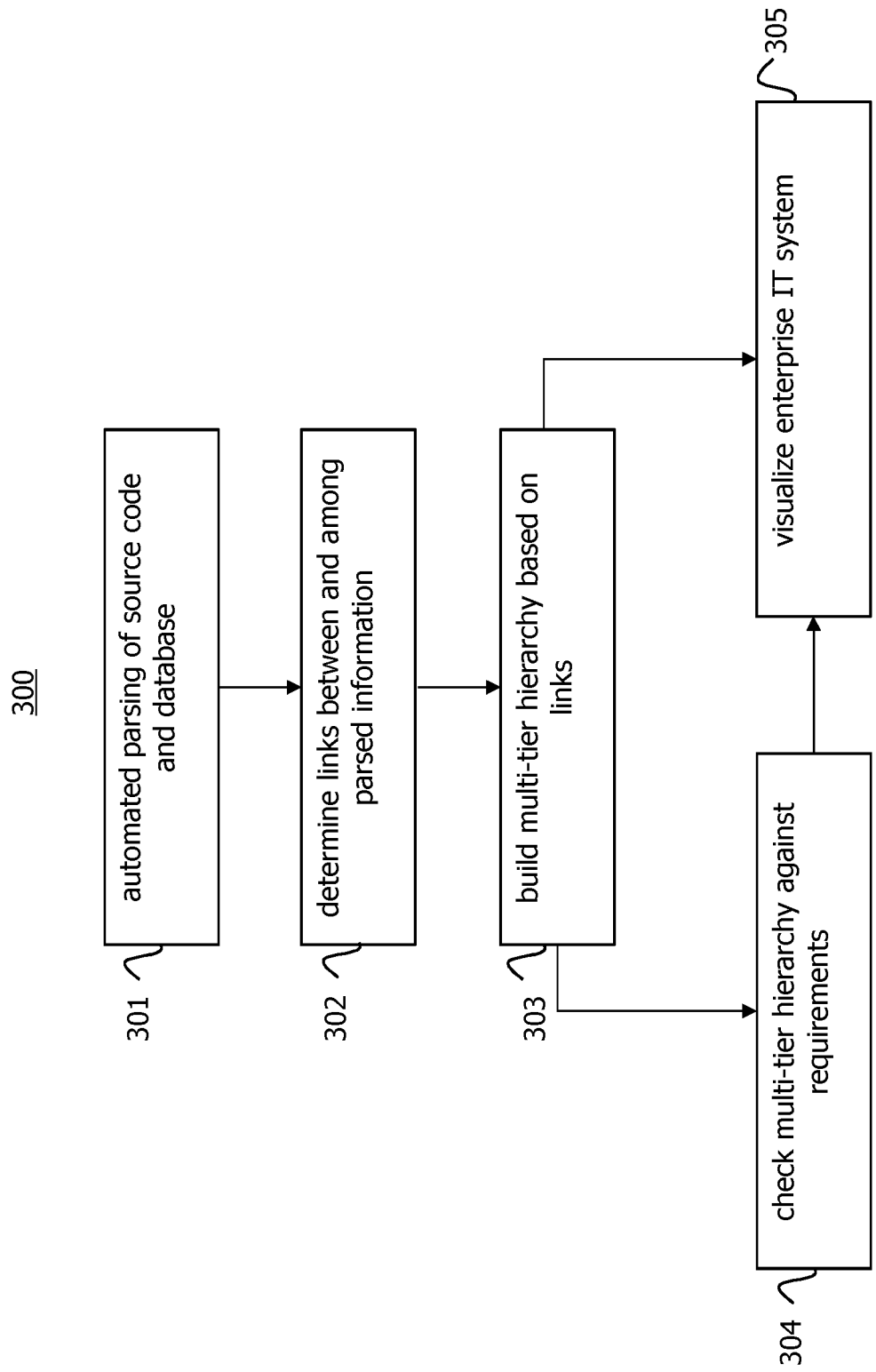

SYSTEMS AND METHODS FOR PROVIDING AN INTERACTIVE VISUALIZATION OF AN ENTERPRISE IT ENVIRONMENT

CROSS-REFERENCE TO RELATED APPLICATIONS

This application claims the benefit of U.S. Provisional Application No. 62/794,381, filed on Jan. 18, 2019, the entire contents of which are hereby incorporated by reference. This application is related to U.S. application Ser. No. 15/087,786, entitled "System and method for Automated Cross-Application Dependency Mapping," filed on Mar. 31, 2016, the contents of which are incorporated herein by reference in its entirety.

BACKGROUND OF THE INVENTION

A typical enterprise IT environment is a combination of older legacy business applications and newer, more modern business applications. Typically, in large organizations, an enterprise-level business application may rely on a combination of various disparate technology platforms across different tiers of its architecture. The intricate interdependencies between these platforms is usually not well documented nor well understood due to the complex nature of the integrations between applications and systems.

With evolving business needs, the architectural complexity behind the integration scheme of legacy and modern business applications within the enterprise IT environment increases over time. Between legacy and modern applications, the legacy applications are typically considered more difficult to maintain, modify, or enhance because there is a general lack of understanding about the legacy application and its dependencies with other applications. For example, those individuals who were considered experts on the subject matter of the legacy application may no longer be available as a resource, whether by retirement or loss of knowledge and expertise over extended periods of time. The situation is worsened with a lack of accessible documentation concerning the operation and integration of the legacy application. For these reasons, a legacy business application can present challenges for those individuals who later join the business organization.

When an IT environment develops an complex architecture, e.g., because of the integration scheme of legacy and modern business applications within the enterprise IT environment, there is typically a lack of available subject matter expertise that presents difficulties and challenges in, for example: (1) analyzing the impact on the enterprise IT environment due to a programming change; (2) assessing potential risks posed by a programming change; (3) sizing the change and regression impact; (4) identifying those project stakeholders who may be impacted by a change; (5) planning the regression test; (6) designing the change optimally; and (7) delivering the change quickly and effectively to the business.

In order to overcome the above challenges and to efficiently and effectively analyze the need for a programming change to a legacy business application and the impact on an enterprise IT environment due to the programming change, the enterprise should be able to easily and quickly identify cross dependencies among applications (both new and legacy) and across the applications' corresponding technology and architectural tiers.

While it is known that the cross-dependency maps are crucial for this type of analysis, it is a complex, time-consuming, and expensive task for the enterprise to generate a useful cross-dependency map from application source code automatically and on-demand. Typically, cross-tier analysis is performed manually, which is time-consuming and prone to error.

Prior methods of generating cross-dependency maps are infrastructure centric and not application centric. There are agent-based or agentless techniques available that probe or detect activities in the server infrastructure, but these techniques do not help perform an analysis of the larger impact resulting from a change to a software application. In addition, the prior methods can only identify hierarchy within a technology tier, which forces a cross-tier analysis to be performed manually. These prior methods are targeted for modern applications, but not for the practical enterprise with an IT environment that includes disparate legacy and modern business applications.

In that regard, a system and method for providing an interactive visualization of an enterprise IT environment, which visually conveys the impact on the enterprise IT environment due to a programming change to a legacy business application, for example, is disclosed herein, which overcomes these and other shortcomings of prior systems.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

BRIEF DESCRIPTION OF THE DRAWINGS

FIG. 3 illustrates a flow diagram of an algorithm used by the architecture of FIG. 2 in accordance with one or more aspects of the disclosure.

DETAILED DESCRIPTION OF EMBODIMENTS OF THE INVENTION

Figure 1:
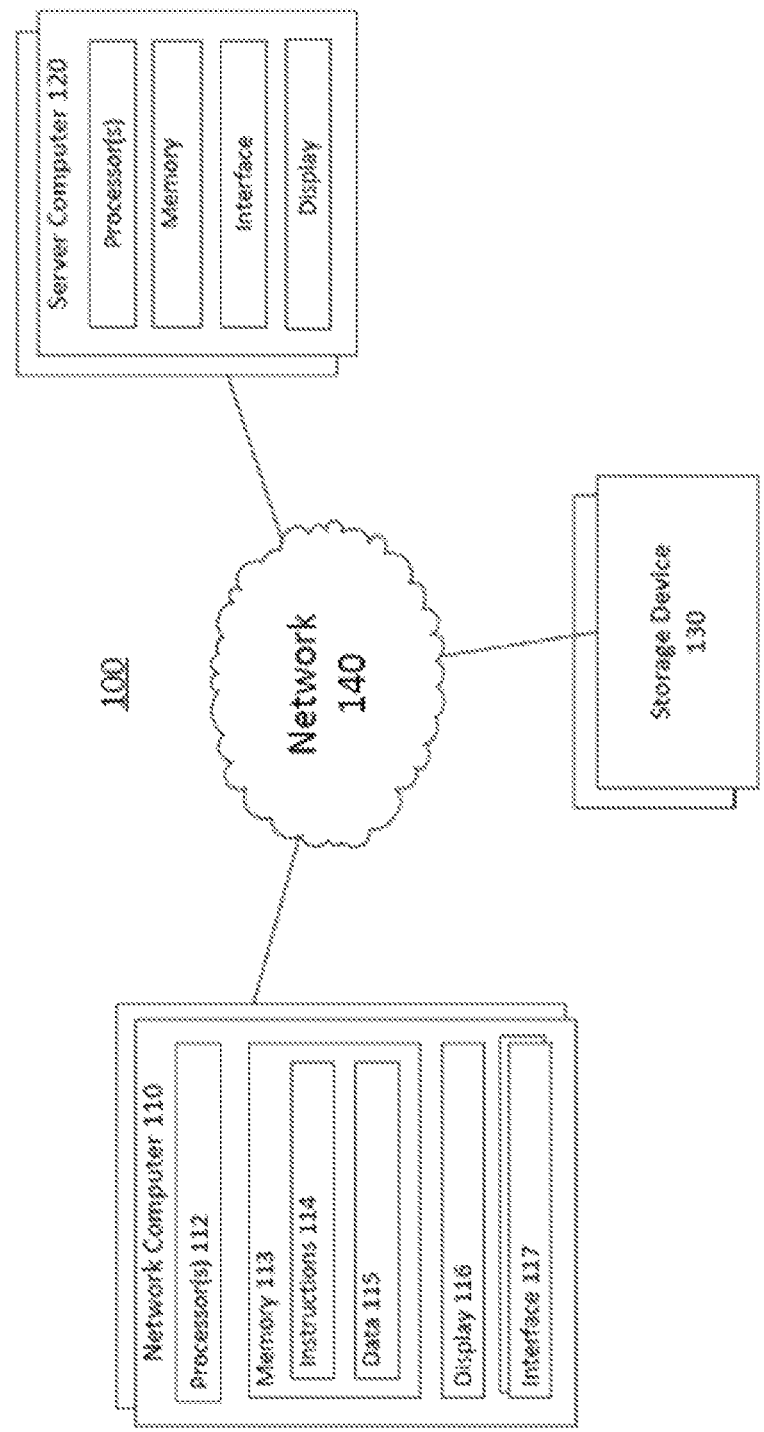
FIG. 1 illustrates an example system in accordance with one or more aspects of the disclosure.

The disclosure is directed to enterprise information technology (IT) environments, and more particularly to more efficient management of such enterprise IT environments through an interactive visualization of the enterprise IT environment via cross-application dependency mapping.

A system and method for providing an interactive visualization of an enterprise IT environment is described herein. Automated code parsing techniques, for example, are used to identify dependencies between and among different business applications within the IT environment, including for both legacy and modern business applications. An interactive visualization of an enterprise IT environment may be provided, which may facilitate a thorough audit of the enterprise-wide IT environment, including whether the IT environment meets certain business and technical requirements, for example. In one aspect, there is the ability to perform canonical and customized searches of dependent elements between components of the IT environment and generate impact reports that can show how desired changes to particular applications may affect the environment. To that end, manual identification of cross-application dependencies and interpretation of data, for instance, may be eliminated.

The present disclosure provides a number of benefits and/or advantages over prior methods of auditing an IT environment. For example, complex and complete bottom-up parsing and analysis of the code base, including all legacy and modern business applications that are part of the larger enterprise IT environment, is available which may help eliminate the draw-backs of a top-down approach to mapping, such as the failure to identify many critical elements and dependencies of the applications in an IT environment. There is end-to-end traceability and the ability to perform scenario-based simulations of changes to the code base to identify how changes to the code of legacy and/or modern business applications will impact the overall enterprise IT environment. In that regard, automated generation of cross-application dependency maps may be used to search for and identify impacted high-level use cases, transaction and screen flows, code, data elements, files, and other technical assets across the enterprise IT environment.

An additional benefit and/or advantage, for example, may be that automated dependency mapping will assist in prioritizing application deliverables and minimize or even eliminate unintentional impact to the enterprise IT environment. Targeted complexity and risk analysis allows for efficiency and timeliness of key decision-making that impacts the overall enterprise on a daily basis. Impact assessment may drive and enhance the comprehensiveness of enterprise environment requirements and design, and provide guidance for targeted regression analysis and test and code coverage metrics, including an assessment of the risk associated with any proposed change to one or more components of the enterprise IT environment. Test cases may be automatically generated and require only subject matter expert (SME) validation.

A further additional benefit and/or advantage, for example, is that integration may be possible with a variety of tools, including MULE ESB (with an available ID Auto Code Generation enhancement), and automatic identification is capable for dead code, obsolete functions, sequence flow, and data points that may be used to establish caller and callee identity. The described automated cross-application dependency mapping may provide efficiency gains of up to eighty percent over traditional manual-based methods.

While the invention may be used in connection with C, C++, VB6, .Net suite, Java/J2EE, Cobol, DCLGEN, JCL, PL/SQL, and Oracle Forms, it should be appreciated that the invention may be equally applicable to other known or future programming languages as well.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

FIG. 1 illustrates an example system 100 in accordance with one or more aspects of the disclosure. For instance, system 100 may represent at least a portion of an IT environment. System 100 may include a plurality of computers and/or computing devices, such as, network computer 110, server computer 120, and storage device 130. By way of example only, network computer 110 is connected to network 140 and may include different types of components associated with a computer, such as one or more processors 112, memory 113, instructions 114, data 115, display 116, and an interface 117. The network computer 110 may be mobile (e.g., laptop computer, tablet computer, smartphone, PDA, etc.) or stationary (e.g., desktop computer, etc.). Similarly, server computer 120 may also include one or more processors, memory, interface, and/or display and may be configured to communicate with other computer devices on network 140.

The processor 112 of network computer 110 may instruct the components thereof to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores at least instructions 114 and/or data 115 that can be accessed by processor 112. For example, memory 113 may be hardware capable of storing information accessible by the processor, such as a ROM, RAM, hard-drive, CD-ROM, DVD, write-capable, read-only, etc. The set of instructions may be included in software that can be implemented on the network computer 110 and should be noted that the terms "instructions," "steps," "algorithm," and "programs" may be used interchangeably. Data 115 can be retrieved, manipulated or stored by the processor 112 in accordance with the set of instructions 114 or other sets of executable instructions. The data 115 may be stored as a collection of data.

The display 116 may be any type of device capable of communicating data to a user, such as a liquid-crystal display ("LCD") screen, a plasma screen, etc. Interface 117 allow a user to communicate with the network computer 110 and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer 120 (and additional server computers) may be rack mounted on a network equipment rack and/or located, for instance, in a data center. In one example, the server computer 120 may use the network 140 to serve the requests of programs executed on network computer 110 and/or storage device 130.

The storage device 130 illustrated in FIG. 1 may be configured to store large quantities of data and/or information. For example, the storage device 130 may be a collection of storage components, or a mixed collection of storage components, such as ROM, RAM, hard-drives, solid-state drives, removable drives, network storage, virtual memory, cache, registers, etc. The storage device 130 may also be configured so that the network computer 110 and/or server computer 120 may access it via the network 140.

The network 140 may be any type of network, wired or wireless, configured to facilitate the communication and transmission of data, instructions, etc. from one component to another component of the network. For example, the network 140 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the network configuration illustrated in FIG. 1 serves only as an example and is thus not limited thereto. System 100, for instance, may include numerous other components connected to network 140, include more than one of each network component (as shown by the cascaded blocks), and network 140 may be connected to other networks.

Figure 2:
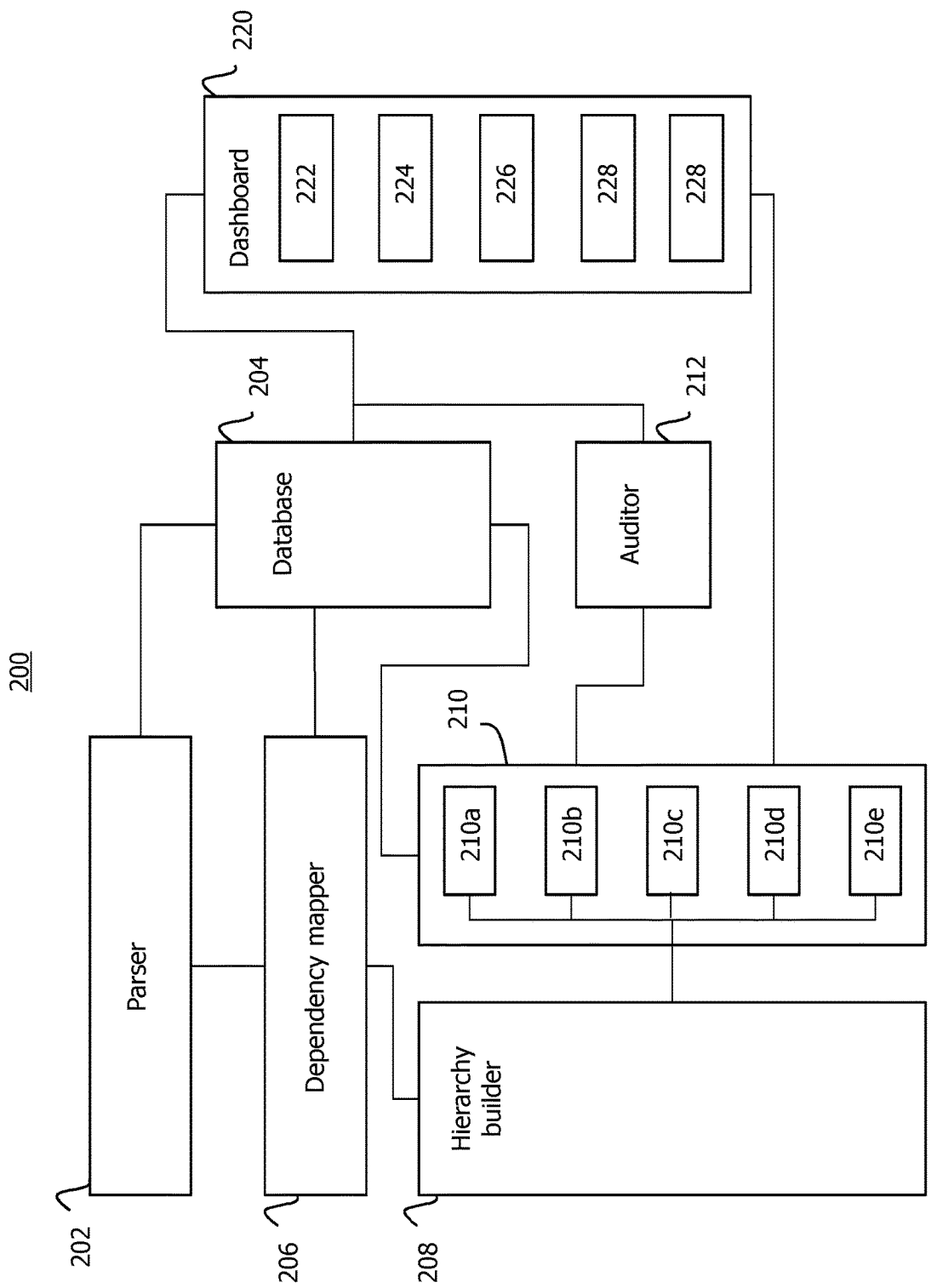
FIG. 2 illustrates a diagram of the architecture in accordance with one or more aspects of the disclosure.

FIG. 2 illustrates one embodiment of an architecture 200 for auditing an enterprise-wide IT environment. The architecture 200 shown in FIG. 2 includes a parser 202, a database 204, a dependency mapper 206, a hierarchy builder 208, an auditor 212, and a dashboard 220 that includes several functional modules, as described herein.

One example of the operation of the system architecture shown in FIG. 2 is as follows. Source code and database reflecting the current state of the IT environment is provided to the parser 202 which uses automated parsing techniques to identify dependencies between and among different business applications, use cases, transactions, data elements and code assets, within the IT environment. After the parser 202 completes parsing all of the relevant source code and database files, a dependency mapper 206 analyzes the information and determines links between and among the parsed information, which are saved in the database 204. The hierarchy builder 208 then builds a multi-tier hierarchy 210 that, for each tier, maps the IT environment according to that tier, across the different technologies in which the IT environment may be implemented.

A "business process" tier 210*a* maps the IT environment according to the different business processes of the IT environment. In building the business process tier, the information extracted from the source code and/or database is tied to the business processes implemented by the IT environment. A "use case" tier 210*b* maps the IT environment according to its different use cases. In building the use case tier, the information extracted from the source code and/or database is tied to the use cases implemented by the IT environment. A "system modules" tier 210*c* maps the IT environment according to its different system modules. In building the system modules tier, the information extracted from the source code and/or database is tied to the system modules of the IT environment. A "source code" tier 210*d* maps the IT environment according to its source code. In building the source code tier, the information extracted from the source code and/or database is used to map the source code to operations or tasks of the IT environment, including a call hierarchy. A "data elements" tier 210*e* maps the IT environment according to its data elements. In building the source code tier, the information extracted from the source code and/or database is used to map the data elements to operations or tasks of the IT environment.

The hierarchy builder 206 also builds the multi-tier hierarchy such that that, each tier is mapped to each other tier. For example, a given business process may include implicate one or more use cases, which may in turn implicate several system modules, and so on down the hierarchy. In the reverse direction, a given code asset or data element may implicate one or more system modules, which may in turn implicate several use cases, which may in turn implicate several business processes. The hierarchy builder 208 takes into account these dependencies in building the multi-tier hierarchy based on the parsed information.

According to a further aspect of the invention, business and/or technical requirements are checked against the multi-tier hierarchy by the auditor 212. The business and/or technical requirements may be pre-existing and/or user-created, and may be input from the database and/or via the user input/output device. In checking the requirements against the multi-tier hierarchy, the auditor 212 may determine whether an implementation is different from the requirements, is missing for the requirements, and/or is an implementation for which there is no requirement. A gap is identified when any of these conditions are determined to exist. Such gaps are identified in association with the appropriate tier, reflecting that the implementation at that tier differs from the requirements checked for. The gaps are provided to the user in connection with the multi-tier hierarchy, and may be similarly accessed by the user through the input/output device, as discussed herein.

According to an additional aspect, source code and database reflecting a target state of the IT environment may be similarly mapped to the multi-tiered hierarchy. As such, the dependencies may be utilized to inform users how the IT environment may be affected by a change from the current state to a target state, including whether the requirements are met by the change.

The multi-tier hierarchy may be accessed by the user through the input/output device, such as a GUI of the network computer 110 and/or the server computer 120, as illustrated in FIG. 1, via the dashboard 220. By way of example, the multi-tier hierarchy may be used, or may be further depended on by other network computers, to maintain, modify, and/or enhance the various applications (and the above-described source files) that are associated with the IT environment. For instance, the multi-tier hierarchy may be used to generate service reports for particular end users, customers, and/or consumers, which may be a series of reports on the various hierarchy tiers associated with the IT environment. These service reports may provide detailed analysis of the tiers and the overall impact and/or implications on the IT environment. In one example, a service report may be in digital format and may be utilized on one or more GUIs by the end user, customers, and/or consumers.

In at least one aspect, the dashboard 220 provides an interactive visualization of the enterprise IT environment, which visualization corresponds to the multi-tier hierarchy that is interactable with by the user, e.g., via the GUI. The dashboard 220 preferably comprises several functional modules.

A tier visualization module 222 is configured to graphically visualize the multi-tier hierarchy via the GUI. The visualization module identifies the links between components of the different tiers, and converts those links and components into user-readable language and graphic form. The visualization module 222, for example, may visualize links between and among business rules, use cases, system modules, source code, and data elements. Such visualization may be according to flow graphs and/or dependency maps. The visualization may also be provided as a 3-panel interface.

A tier traversal module 224 is configured to enable the user to traverse among and across the tiers of the multi-tier hierarchy, e.g., via the GUI. Entry points via which the tiers are able to be traversed are determined, and the tier traversal module 224 provides hyperlinks navigationally linking these entry points and components in accordance with the multi-tier hierarchy. Navigational links may thus be formed, for example, across and among business rules, use cases, system modules, source code and data elements. Thus, for example, the user may navigate from a use case, test case, or business rule, directly to the code it relates to and vice versa.

A reporting module 226 generates reports that may be visualized by the visualization module 222. The reports may include the complete details of a particular service operation or task or corresponding transactions, source code or data elements, generated in accordance with the multi-tier hierarchy. Such reports may relate to a current state analysis, a target state analysis, a test case analysis, and a business rule analysis. The reports may also provide a visual mapping between current and target states, including scenario based simulation visualization.

A migration module 228 is configured to facilitate code and/or logic migration from legacy (i.e., current state) components of the enterprise IT environment to modern (i.e., target state) components. The migration module 226 automatically generates code files in the target components, which have been mapped to the current state components via the multi-tier hierarchy, which are then utilized to migrate logic from the legacy components.

A search module 230 is configured to conduct a semantic analysis on a search string input by the user, e.g., via the GUI, and to present an associated dependency map that identifies portions of the enterprise IT environment relevant to the search string. The semantic analysis includes consulting the multi-tier hierarchy for dependencies across and among tiers. As such, the search module 228 may be utilized to search for and identify impacted high-level use cases, transaction flows, etc. across the enterprise IT environment.

Accordingly, the functionality of enterprise IT environment may be decomposed in a highly intuitive manner. End-to-end traceability of the enterprise IT environment across and among each of the tiers of the multi-tier hierarchy may also be provided. A comprehensive assessment of the enterprise IT environment is thereby facilitated.

As described above, FIG. 3 illustrates a flow-diagram 300 of an algorithm used by the architecture of FIG. 2 in accordance with one or more aspects of the disclosure. As shown, at step 301, the source code and database reflecting the current state of the IT environment is provided to the parser 202 which uses automated parsing techniques to identify dependencies between and among different business applications, use cases, transactions, data elements and code assets, within the IT environment. At step 302, a dependency mapper 206 analyzes the parsed information and determines links between and among the parsed information, which are saved in the database 204. At step 303, the hierarchy builder 208 builds a multi-tier hierarchy 210 that, for each tier, maps the IT environment according to that tier, across the different technologies in which the IT environment may be implemented. At step 304, business and/or technical requirements are checked against the multi-tier hierarchy by the auditor 212, and gaps are identified. In this manner, the advantages of the invention are achieved. At step 305, the interactive visualization of the enterprise IT environment is generated corresponding to the multi-tier hierarchy.

In accordance with foregoing embodiments, examples, and/or aspects of the invention, source code of all source files relevant to a desired configuration are automatically parsed and all dependencies between functions and transactions across application boundaries are identified. For any function or transaction, it is possible to identify all relevant callers across application boundaries at any point in time. End-to-end traceability of functions, transactions, or services across application boundaries is provided. A call trace may be viewed by starting at any level of the call hierarchy, and the callers can be traced to the source application that invokes the relevant function, transaction, or service. The embodiments of the invention provide the ability to search all callers of a particular function, transaction, or service across application tiers, and callers may be searched by starting at the application boundary level. In addition, potential orphans and duplicates can be identified at any point, with the call hierarchy function usable to identify duplicates.

In a further aspect of the disclosure, as discussed herein, an easy-to-use, intuitive GUI is provided that includes the dashboard that permits a user to view end-to-end traceability of relevant functions, transactions, or services, and to view and navigate between the tiers of the multi-tier hierarchy. Links may be provided within the GUI that can be clicked by a user in order to navigate directly to the relevant code from a given use case, test case, or business rule, and vice versa.

While certain exemplary embodiments have been described and shown in the accompanying drawings, it is to be understood that such embodiments are merely illustrative of and not restrictive on the broad inventions, and that this inventions not be limited to the specific constructions and arrangements shown and described, since various other modifications may occur to those ordinarily skilled in the art.

The invention claimed is:

1. A system for providing a graphical user interface on a display, the system comprising:
    a storage device, wherein the storage device stores a database that includes a multi-tier hierarchy that maps links between and among a plurality of tiers of an enterprise IT environment based on service operation call dependencies between a plurality of software applications of the enterprise IT environment and across application boundaries of different programming language; and a processor in communication with the database, wherein the processor executes software stored on a non-transitory computer medium so as to thereby cause a computing device to:

generate and display the graphical user interface, wherein the graphical user interface includes a dashboard that provides a user-interactive visualization of the enterprise IT environment generated based on the multi-tier hierarchy, wherein the user-interactive visualization includes an end-to-end graphical representation of the service operation call dependencies of respective software functions, transactions and services between the plurality of software applications and across application boundaries of the enterprise IT environment, wherein the end-to-end graphical representation includes visually navigable links via which each service operation call is visually navigable by a user from any of the plurality of tiers to source code of the software application invoking the respective function, transaction or service of the service operation call.

2. The system of claim 1, wherein the plurality of tiers comprises: a business process tier, a use case tier, a system modules tier, a source code tier, a data elements tier, each tier consisting of respective tier elements.

3. The system of claim 1, further comprising:
a tier visualization module configured to identify the links of the multi-tier hierarchy, and to visualize the links via the dashboard.

4. The system of claim 1, further comprising:
a tier traversal module configured to enable the user to visually traverse among and across the tiers via the dashboard.

5. The system of claim 1, further comprising:
a reporting module configured to generate reports related to the enterprise IT system based on the multi-tier hierarchy, wherein the reports are accessible via the dashboard.

6. The system of claim 1, further comprising:
a search module configured to conduct a semantic analysis on a search string input via the dashboard, and to present an associated dependency map identifying portions of the IT environment based on the search string and the multi-tier hierarchy.

7. A method for providing a graphical user interface on a display, the method comprising:

storing a multi-tier hierarchy in a database, wherein the multi-tier hierarchy maps links between and among a plurality of tiers of an enterprise IT environment based on service operation call dependencies between a plurality of software applications of the enterprise IT environment and across application boundaries of different programming language; and generating and displaying the graphical user interface, wherein the graphical user interface includes a dashboard that provides a user-interactive visualization of the enterprise IT environment generated based on the multi-tier hierarchy, wherein the user-interactive visualization includes an end-to-end graphical representation of the service operation call dependencies of respective software functions, transactions and services between the plurality of software applications and across application boundaries of the enterprise IT environment, wherein the end-to-end graphical representation includes visually navigable links via which each service operation call is visually navigable by a user from any of the plurality of tiers to source code of the software application invoking the respective function, transaction or service of the service operation call.

8. The method of claim 7, wherein the plurality of tiers comprises: a business process tier, a use case tier, a system modules tier, a source code tier, a data elements tier, each tier consisting of respective tier elements.

9. The method of claim 7, further comprising: identifying, via a tier visualization module, the links of the multi-tier hierarchy; and visualizing the links via the dashboard.

10. The method of claim 7, further comprising: visually traversing, via the dashboard, among and across the tiers.

11. The method of claim 7, further comprising: generating reports related to the enterprise IT system based on the multi-tier hierarchy, wherein the reports are accessible via the dashboard.

12. The method of claim 7, further comprising: conducting a semantic analysis on a search string input via the dashboard; and presenting an associated dependency map identifying portions of the IT environment based on the search string and the multi-tier hierarchy.

* * * * *